United States Patent
Cooperman (10) Patent No.: US 10,489,499 B2
(45) Date of Patent: *Nov. 26, 2019

(54) DOCUMENT EDITING SYSTEM WITH DESIGN EDITING PANEL THAT MIRRORS UPDATES TO DOCUMENT UNDER CREATION

(71) Applicant: Adobe Inc., San Jose, CA (US)

(72) Inventor: Justin Cooperman, San Mateo, CA (US)

(73) Assignee: Adobe Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/030,512

(22) Filed: Jul. 9, 2018

(65) Prior Publication Data
US 2018/0314682 A1    Nov. 1, 2018

Related U.S. Application Data

(63) Continuation of application No. 15/389,277, filed on Dec. 22, 2016, now Pat. No. 10,061,755.

(51) Int. Cl.
| | |
|---|---|
| *G06F 17/00* | (2019.01) |
| *G06F 17/24* | (2006.01) |
| *G06F 17/21* | (2006.01) |
| *G06F 17/22* | (2006.01) |
| *G06F 3/0481* | (2013.01) |

(52) U.S. Cl.
CPC .......... *G06F 17/24* (2013.01); *G06F 3/04817* (2013.01); *G06F 17/212* (2013.01); *G06F 17/2241* (2013.01)

(58) Field of Classification Search
CPC ...... G06F 17/24; G06F 17/212; G06F 16/958; G06F 3/0482; G06F 17/2241; G06F 3/04817
See application file for complete search history.

(56) References Cited

U.S. PATENT DOCUMENTS

| | | | | |
|---|---|---|---|---|
| 6,081,262 A | * | 6/2000 | Gill | G06F 16/40 715/202 |
| 6,199,082 B1 | * | 3/2001 | Ferrel | G06F 16/958 715/205 |

(Continued)

OTHER PUBLICATIONS

Ishii, Hiroshi, et al, "Integration of Interpersonal Space and Shared Workspace: ClearBoard Design and Experiments", ACM Transactions on Information Systems (TOIS), vol. 11, Issue 4, Oct. 1993, pp. 349-375. (Year: 1993).*

(Continued)

*Primary Examiner* — Laurie A Ries
(74) *Attorney, Agent, or Firm* — Keller Jolley Preece (57) ABSTRACT

A document editing system provides a design editing panel with a document under creation. The document editing system provides a representation of the document under creation on the design editing panel using a plurality of graphical editing features, where each of the graphical editing features are interactive to receive an input for editing a corresponding content element of the document under creation. In response to editor input that alters an appearance of at least a content element of the document under creation, the document editing system alters an appearance of one or more graphical editing features of the design editing panel.

20 Claims, 6 Drawing Sheets

(56) References Cited

U.S. PATENT DOCUMENTS

| | | |
|---|---|---|
| 6,285,369 B1 | 9/2001 | Kross |
| 6,725,427 B2* | 4/2004 | Freeman ................ G06F 16/30 |
| | | 715/273 |
| 9,213,460 B2* | 12/2015 | Nurse ..................... G06F 3/048 |
| 9,619,128 B2 | 4/2017 | Edge |
| 10,061,755 B2 | 8/2018 | Cooperman |
| 2002/0073114 A1 | 6/2002 | Nicastro |
| 2003/0097640 A1* | 5/2003 | Abrams ................ G06F 17/241 |
| | | 715/255 |
| 2004/0205644 A1 | 10/2004 | Shaughnessy |
| 2005/0069225 A1 | 3/2005 | Schneider |
| 2010/0180213 A1 | 7/2010 | Karageorgos |
| 2011/0178981 A1 | 7/2011 | Bowen |
| 2012/0324428 A1 | 12/2012 | Ryan |
| 2013/0212524 A1* | 8/2013 | Nurse ..................... G06F 3/048 |
| | | 715/788 |
| 2014/0082530 A1* | 3/2014 | De Oliveira .......... G06F 17/211 |
| | | 715/762 |
| 2014/0208203 A1* | 7/2014 | Tang ..................... G06F 17/212 |
| | | 715/252 |
| 2014/0344004 A1* | 11/2014 | Surendran ........ G06Q 10/06316 |
| | | 705/7.26 |
| 2016/0110313 A1 | 4/2016 | Prakash |
| 2016/0299678 A1 | 10/2016 | Raber |

OTHER PUBLICATIONS

U.S. Appl. No. 15/389,277, Dec. 13, 2017, Office Action.
U.S. Appl. No. 15/389,277, Apr. 20, 2018, Notice of Allowance

* cited by examiner

DOCUMENT EDITING SYSTEM WITH DESIGN EDITING PANEL THAT MIRRORS UPDATES TO DOCUMENT UNDER CREATION

RELATED APPLICATIONS

This application is a continuation of U.S. patent application Ser. No. 15/389,277, filed on Dec. 22, 2016, the aforementioned priority application being hereby incorporated by reference in its entirety for all purposes.

TECHNOLOGY FIELD

Examples as described relate to a document editing system with a design editing panel that mirrors a document under creation.

BACKGROUND

Document editing systems enable creation of numerous types of electronic documents (e.g., emails, catalogs, etc.). Typically, the document editing systems provide graphic features as tools for enabling the user to design a canvas for a document. The functionality provided in such manner by conventional approaches tends to be generic with respect to the type of content being modified. Moreover, the graphic features typically do not reflect a state of the document that is being created.

DETAILED DESCRIPTION

According to some examples, a document editing system provides a design editing panel with a document under creation. The document editing system provides a representation of the document under creation on the design editing panel using a plurality of graphical editing features, where each of the graphical editing features are interactive to receive an input for editing a corresponding content element of the document under creation. In response to editor input that alters an appearance of at least a content element of the document under creation, the document editing system alters an appearance of one or more graphical editing features of the design editing panel.

In some variations, a document editing system provides a design editing panel to enable an editor to make a selection of a plurality of content elements for display as part of the document under creation. The document under creation is structured to display the plurality of content elements as part of the document under creation, in accordance with each of (i) a spatial arrangement of the content elements, and (ii) a logical relationship as between at least some of the f content elements. A plurality of graphical editing features is provided with the design editing panel. Each of the plurality of graphical editing features enables an editor to change an attribute of a corresponding content element of the document under creation. The plurality of graphical editing features may be arranged to reflect each of (i) a position of one or more of the content elements in the spatial arrangement, and (ii) the logical relationship amongst at least some of the content elements. An editor may interact with the document under creation to alter the spatial arrangement amongst at least some of the plurality of content elements. In response to the spatial arrangement of the plurality of content elements being altered, the document editing system automatically alters the arrangement of the plurality of graphical editing features to reflect the position of one or more of content elements in the altered spatial arrangement.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples described herein can be carried and/or executed. In particular, the numerous machines shown with examples described herein include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, servers, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

Figure 1:
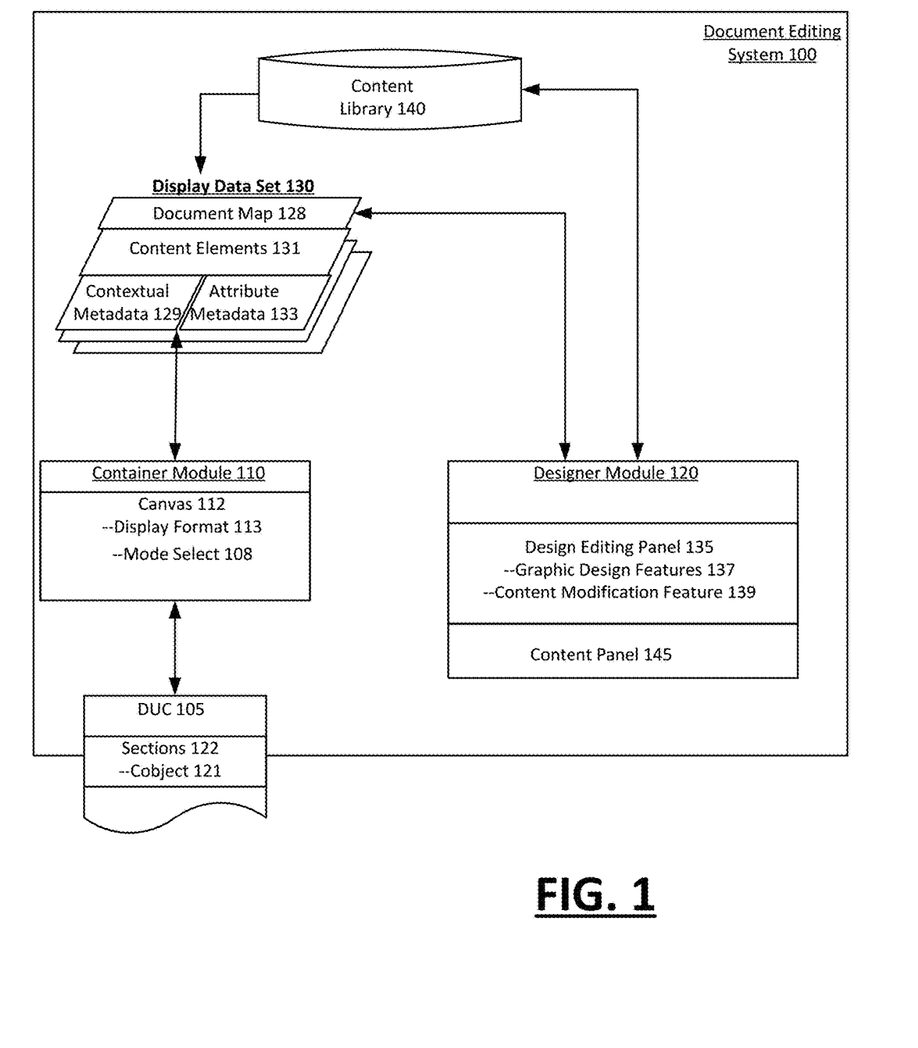
FIG. 1 illustrates a document editing system 100, according to one or more examples.

FIG. 1 illustrates a document editing system 100, according to one or more examples. As described with some examples, the system 100 enables an editor to compose content for an electronic document (document under composition or "DUC 105"), using a canvas (or document under creation (shown as "DUC 105")) and design editing panel 135 which are logically and visually linked to one another. By way of example, the DUC 105 may correspond to an email, web page, catalog, newsletter, or document. The DUC 105 can present content elements of different types in accordance with a layout, structure and appearance, based on the editor's input and selection. The design editing panel 135 provides a collection of graphical editing features 137 for altering content elements that are provided on the DUC 105. As described in greater detail, the design editing panel 135 may arrange and display graphical editing features 137 in a manner that reflects the layout, structure and appearance of the DUC 105. Moreover, the design editing panel 135 mirrors a visual state of the DUC 105, so that input that modifies the appearance of content elements of the DUC 105 are reflected in the manner in which the design editing panel 135 displays the graphical editing features 137 to alter the content elements of the DUC 105. The input to modify the appearance may reflect changes to visual attributes or other state changes (e.g., such as highlighting as a result of pre-selection input).

Depending on implementation, the system 100 can be implemented in alternative computing environments. In one implementation, the system 100 is implemented on a server, or a combination of servers, such as part of a network service. In variations, the system 100 may be implemented on a standalone computer system, such as a workstation or personal computer.

With reference to FIG. 1, the system 100 includes a container module 110, a design module 120, and a document data set 130. The container module 110 may operate to generate the DUC 105 using the document data set 130. The designer module 120 provides the design editing panel 135 as an interface, separate from the DUC 105, for the editor to use in designing and updating the DUC 105. The document data set 130 may be updated with user interaction to either of the container module 110 or the designer module 120. When the document data set 130 is updated by the user, each of the container module 110 and the designer module 120 reflect the update via the respective DUC 105 and the design editing panel 135.

According to examples, the document data set 130 identifies, or includes content elements 131 that are selected for use with the DUC 105. The content elements 131 can be created by the user and/or selected from a content library 140. The content elements 131 may have a variety of different data types or formats, including formats for images, animation, media, and/or text.

In some examples, the document data set 130 includes content elements 131 and metadata associated with the content elements. The content element 131 may be associated with attribute metadata 133 that identifies, for example, visual characteristics and other aspects of the respective content elements 131. For example, the attribute metadata 133 associated with a given content elements 131 may identify values or parameters for color, size, fill, border characteristic, and/or other visual characteristic of the content element.

In some examples, the content elements 131 may be implemented in the DUC 105 as at least one of a content object 121 or a section 122. The section 122 may correspond to a region of the DUC 105, such as a linear strip extending across the document. The section 122 may include, for example, attributes such as background image elements, size and other visual attributes that are intended to define the appearance of the corresponding region of the DUC 105. While sections 122 may visually differ from one another, the sections 122 may share a common dimensional or shape attribute, such as an overall width or rectangular shape. A content object 121 may correspond to a self-contained content element, or collection of content elements, which can be manipulated (e.g., color or size change) independent of other content elements of the DUC 105. Still further, a content object 121 may correspond to a container that can be positioned and manipulated on the DUC 105 to receive content on the DUC 105 from the user. For example, the content objects 121 can include a text box which receives text input from the user.

In some variations, the content objects 121 are rendered with the DUC 105, and receive input to modify a visual attribute or context (e.g., position, logical relationship) of the content object, independent of other content elements. Additionally, in some examples, content objects 121 can include multiple content elements that can be modified or manipulated on the DUC 105 as a single object. Still further, a content object 121 may include content elements that have a dependent or hierarchical relationship with other content elements of the same object. For example, a content object 121 may be implemented as a text field that can be combined with an image. In such an example, the content object 121 can receive input to alter the attribute of the content object as a whole (e.g., size or coloring). Additionally, individual content elements of the content object 121 may receive input that does not alter the other content element(s) of the content object. If a hierarchical or dependent relationship is defined for the content elements of the content object 121, then input to alter attributes of one content element of the object may similarly affect the dependent content element, but not vice-versa.

In some examples, the document data set 130 includes a document map 128, which provides a metadata representation of the DUC 105. The document map 128 may include the content elements 131 of the DUC 105, the attribute metadata 133 associated with the individual content elements 131, and the contextual metadata 129 of the content elements 131 (e.g., the layout and structure of the document, type of content elements, logical associations between content elements, etc.).

The container module 110 provides a structured and functional canvas 112 which can be populated with data from the document data set 130, in order to render the DUC 105. In some examples, the canvas 112 includes logic that sub-divides the DUC 105 into regions on which content elements 131 of different types may be provided. In some examples, the canvas 112 structures the DUC 105 to render individual selected content elements 131 as at least one of a content object 121 or a section 122, with each section defining a region or area of the DUC 105. Each content element 131 may be associated with attribute metadata 133 that identifies visual characteristics of the content element. When content elements 131 are selected, the canvas 112 may also generate contextual metadata 129 that defines a type for the content element (e.g., whether the content element is part of a section 122 or a content object 121), a position of the content element 131 relative to the DUC 105 or other content elements, and/or a logical relationship between the content element 131 and other content elements.

The canvas 112 can map user input received through the DUC 105 to identify a content element and a corresponding action. When user input is received to alter a state of the DUC 105, the canvas 112 may generate or alter the contextual metadata 133 that is associated with one or more content elements that are in use on the DUC 105, and the collective metadata as represented by the document map 128 may be changed.

In some examples, the designer module 120 implements the design editing panel 135 as a peripheral or accessorial user interface that accompanies the DUC 105. In one implementation, the design editing panel 135 occupies a dedicated region that is adjacent to the DUC 105. In variations, the design editing panel 135 may be provided as a window or widget that overlays the DUC 105, or resides separately on a computer systemic the user. In some examples, the designer module 120 also provides a content panel 145 with the design editing panel 135, which enables the user to access or use a content source (e.g., template library 140) in order to select content elements for the DUC 105. The content library 140 may maintain a library of content elements 131 for selection by the user. The content library 140 may store some content elements in a pre-structured form. For example, some content elements may be pre-structured to represent a section of the DUC 105. Still further, some content elements 131 may be of a structure that enables the content element to contain or link to other content elements. The selection from the content library 140 may add the corresponding content element to the document data set 130, where it is rendered on the DUC 105.

In some examples, the designer module 120 utilizes the document map 128 to generate the design editing panel 135. The design editing panel 135 includes graphical editing features 137 that individually represent content elements of the DUC 105, and collectively provide a visual and logical representation of the structure and contents of the DUC 105. The user may interact with the graphical editing features 137 of the design editing panel 135 in order to change the contextual metadata 129 and attribute metadata 133 of specific content elements. As the graphical editing features 137 may individually correspond to content elements of the DUC 105, the changes specified through user input may affect the document map 128, and the changes to the document map 128 may be reflected in the DUC 105.

In some examples, the graphical editing features 137 are individually arranged to reflect a layout and/or structure of the DUC 105 and its content elements 131. Accordingly, each of the graphical editing features 137 may be presented on the design editing panel 135 relative to one or more other content elements 131 using the document data set 130. Each graphical editing feature 137 may also be structured visually and/or functionally based on a type of content element (e.g., as section 122 or content object 121) that the graphical editing feature 137 corresponds to.

For example, a user can interact with individual graphical editing features 137 of the design editing panel 135 in order to alter color, shading, border, filling, shape or size of a given content element 131 on the DUC 105. The user interaction with the graphical editing features 137 results in changes to the contextual and/or attribute metadata 129, 133 of the corresponding content element 131. The change in metadata may be recorded with the document data set 130. In this way, the document data set 130 is changed, and the changed data set (e.g., attribute metadata 133 of a given content element 131) is reflected in the DUC 105.

According to some examples, the design editing panel 135 may include graphical editing features 137 that are arranged in a spatial order (e.g., top down arrangement) or alignment to reflect the arrangement of sections 122 on the DUC 105. The user can select (e.g., highlight), modify (e.g., from the content library 140) or delete content elements of the DUC 105, by performing corresponding actions with respect to the graphical editing features 137 of the design editing panel 135. The user can also rearrange content elements of the DUC 105 by performing a similar action on corresponding graphical editing features 137 of the design editing panel 135. When actions are performed on the graphical editing features 137 of the design editing panel 135, the actions can generate changes to the contextual metadata 129 and attribute metadata 133 of the document map 128, resulting in changes being made to the DUC 105. In this way, the user interaction with the design editing panel 135 can modify the document map 128 (and the DUC 105) by changing attribute metadata 133 (e.g., color of content element) associated with individual content elements. Additionally, the user interaction with the design editing panel 135 can alter, for example, a position, logical relationship or other context of a content element of the DUC 105, by changing the contextual metadata 129 associated with the content element 131 of the document data set 130.

The user may also add content elements through interaction with the content panel 145. When a new content element is added to the DUC 105, the canvas 112 may generate contextual metadata 129 (e.g., to identify type of content element, position on layout, etc.) and attribute metadata 133 for the document map 128. The additional of the content element 131 can also generate one or more corresponding graphical editing features 137 on the design editing panel 135, based on the changes to the document map 128. The designer module 120 may refresh the document editing panel, so that the new content element is represented by a new graphic editing feature 137 that has an appearance based on the attribute metadata 133. Additionally, the corresponding graphic editing feature 137 may be positioned relative to other graphic editing features to reflect the layout of the DUC 105 with the inclusion of the 105. For example, the vertical position of the new graphic editing feature 137 on the design editor panel 135 may convey the vertical placement of the new content element 131 on the DUC 105. Likewise, the user can drop the new content element 131 in the same area as another content element of the DUC 105, in order to convey a logical relationship between the newly added content element and the existing content element provided on the DUC 105. The canvas 112 can record the relationship with the contextual metadata 129 of the document map 130, which in turn may result in the corresponding graphic editing features 137 on the design editor panel 135 being arranged or positioned to reflect the logical relationship.

The user may also interact with the rendered content elements of the DUC 105 to implement a change in the document data set 130. The canvas 112 may detect user interaction, and determine a change in one or more content elements 131 or their respective contextual or attribute metadata 129, 133. The container module 110 updates the document data set 130, including the document map 128, to reflect the changes of the user interaction. When the document data set 130 is updated, the designer module 120 updates the design editing panel 135 to reflect the change to the document data set 130. For example, the ordering or layout of a set of graphical editing features that represent the sections 122 of the DUC 105 may be updated based on changes to the document map 128.

According to some examples, the DUC 105 and the design editing panel 135 can be presented concurrently in a manner that is visually synchronized. As described, the design editing panel 135 can provide graphical editing features 137 and other interactive elements to enable selection and configuration of sections 122 and content elements 131 of the DUC 105. Additionally, in some examples, the graphical editing features 137 individually, and collectively, provide a visual representation of the layout of the DUC 105, as well as of the individual content elements that are provided on the DUC 105.

As described with some examples, the DUC 105 and the design editing panel 135 may also be functionally linked, so that user interaction with the DUC 105 is automatically implemented and/or visually represented on the design editing panel 135. In some examples, the user can provide input to pre-select or highlight a particular content element of the DUC 105. The canvas 112 can implement logic to detect the pre-selection input, and associates metadata of the particular content element 131 with the pre-selection input. In response to receiving the pre-selection input, the canvas 112 may highlight or otherwise visually display the particular content element 131 on the DUC 105 in a pre-selected state. The designer module 120 can implement logic to highlight (e.g., visually marking), or pre-select the corresponding graphical editing feature 137 of the design editing panel 135 that corresponds to the particular content element, in response to the pre-selection input being received on the DUC 105.

In variations, the pre-selection input provided on the content element 131 can cause the designer module 120 to perform a particular pre-selection action that is specific to a type of the content element receiving the pre-selection input. For example, pre-selection input provided by the user for one of the sections 122 of the DUC 105 may cause the designer module 120 to expand (as well as highlight) the corresponding graphical editing feature 137 on the design editing panel 135. When expanded, the corresponding graphical editing feature 137 may display the content modification feature 139 for content elements 131 that are provided with the section 122.

The DUC 105 and the design editing panel 135 may also be functionally linked, so that input received through the design editing panel 135 can be reflected by the DUC 105. The design editing panel 135 may also include logic to enable pre-selection input (e.g., user single-clicks a particular graphical editing feature 137 or content modification feature 139). The designer module 120 may update the document data set 130 with metadata to identify the corresponding content element of the DUC 105 that is to be highlighted. The container module 110 can respond to the update, and the canvas 112 can identify and highlight or otherwise place the corresponding content element in a pre-selected state.

In some examples, the canvas 112 can include logic that alters the layout or configuration of the DUC 105 to simulate different computing environments. For example, the canvas 112 can include alternative formats 113 that enables the DUC 105 to toggle between display formats that show how the electronic document will be rendered on alternative computing environments (e.g., mobile computing platform or desktop computer). The canvas 112 may enable multiple alternative formats which the editor can toggle between in order to view altered forms of the DUC 105 for different computing environments. Each selected format may alter format or design rules of the canvas 112 for defining, for example, content types such as sections 122. When the DUC 105 is toggled to change formatting, some examples further provide for changes to the design editing panel 135, to reflect changes made as a result of alternative format or design rules that affect a manner of how the DUC 105 will be rendered.

FIG. 2A through FIG. 2E illustrate examples of a document editing system, such as described with examples of FIG. 1. In describing examples of FIG. 2A through FIG. 2E, reference is made to elements of FIG. 1 for purpose of illustrating suitable components for implementing examples as described.

Figure 2A:
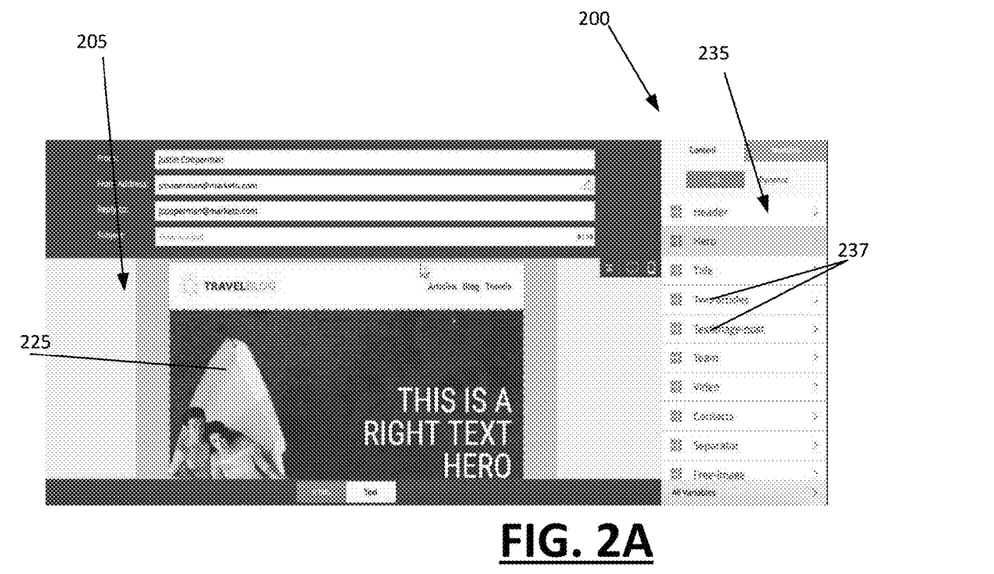
FIG. 2A through FIG. 2E illustrate examples of a document editing system, such as described with examples of FIG. 1.

In an example of FIG. 2A, a presentation 200 is rendered using, for example, the system 100, in order to enable an editor to construct an electronic document using an interactive design editing panel 235. In examples shown, the document under construction (DUC) 205 corresponds to an email. In variations, the DUC 205 may correspond to, for example, a newsletter, catalog, booklet, report, etc. The presentation 200 may be generated by a computer system on which the system 100 is implemented, such as, for example, a workstation, desktop computer, laptop, tablet, or other computer system. In one example, the system 100 is implemented as a network service (e.g., such as provided over an enterprise network or the Internet) that can be accessed by an editor operating a browser or web-based application running on a workstation. In variations, the system 100 may be implemented as a local program, executable as a stand-alone application, or as part of another application (e.g., as a plug-in for a document editor). In other variations, the system 100 may be implemented as a hybrid application or program that utilizes a combination of network and local resources to generate the presentation 200 and provide functionality as described.

In FIG. 2A, the DUC 205 includes a layout of content elements, including content elements which are structured as sections, occupying regions of the DUC 205. The design editing panel 235 structures and arranges interactive design features in accordance with a layout of the DUC 205. In an example shown, each content element 225 of the DUC 205 includes a corresponding graphical editing feature 237 that is selectable with user input. The design editing panel 235 can, for example, arrange graphical editing features 237 in a top-down orientation that mirrors the manner in which content elements are arranged and/or structured on the DUC 205. Each graphical editing feature 237 can include, or otherwise provide access to additional design features for enabling the editor to alter, for example, the attributes of the content element.

According to some examples, the presentation 200 can also provide access to a content panel 245. For example, the design editing panel 235 and the content panel 245 may be toggled to make one of the two panels active over the other of the two panels. The content panel 245 can provide the user with access to a template library 140 of content elements. The user can, for example, select the content elements from the content library 140, and then provide input via the design editing panel 235 in order to modify attributes of the selected content elements.

The user may interact with either the DUC 205 or the design editing panel 235 to affect changes to the DUC 205. The user interaction with the DUC 205 may be immediately reflected with the design editing panel 235. Likewise, the user's interaction with the design editing panel 235 can also be immediately reflected on the DUC 205.

In an example of FIG. 2A, the user can highlight or preselect individual content elements, such as a given section of the DUC 205. For example, the user can use a pointer device or touch screen to single click the content element of the given section represented by "hero". When the preselection input is received on the DUC 205, the corresponding graphical editing feature 237 may also be highlighted (e.g., by shading or variation in coloring). This facilitates the user in identifying the graphical editing feature 237 that can be selected to alter or modify the particular content element 225 (e.g., section) of the user input. Thus, for example, the user may select to edit a particular content element 225 by first interacting with the DUC 205, in order to highlight the corresponding graphical editing feature 237, through which further edits can be made to the content element 225.

Figure 2B:
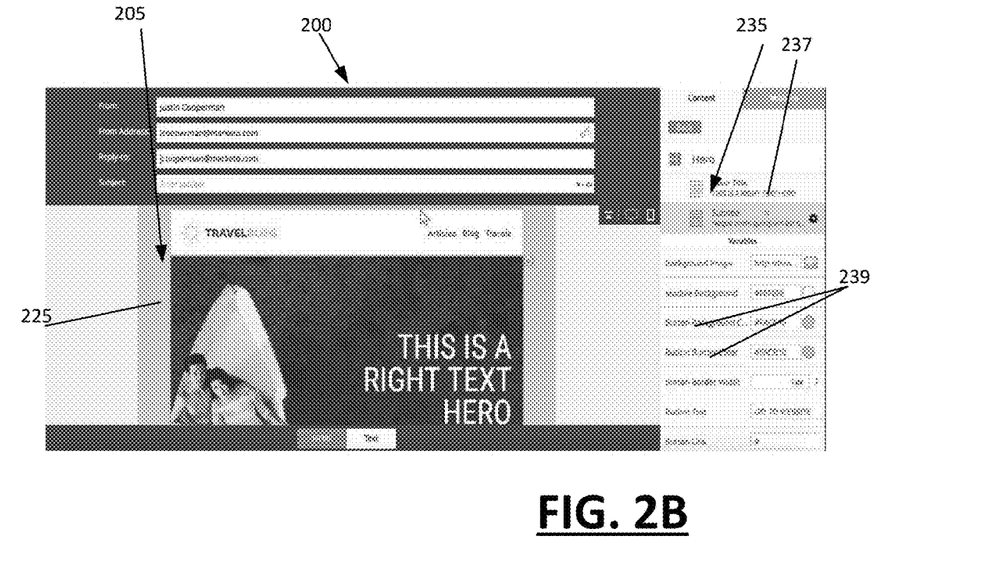

In an example of FIG. 2B, each of the DUC 205 and the design editing panel 235 are shown in an altered state, to reflect actions performed as a result of pre-selection input received on the DUC 205. In response to one of the content elements 225 receiving the pre-selection input, the corresponding graphical editing feature 237 can be highlighted by expanding the feature to expose one or more content modification features 239. The user can interact with the content modification features 239 to specify changes to, for example, the attribute metadata of the selected content element 225. As described with an example of FIG. 2A, the graphical editing feature 237 off the pre-selected content element can be highlighted by the user, either by user interaction with the specific sectional feature or by user interaction with the corresponding content element of the DUC 205. In an example of FIG. 2B, the graphical editing feature 237 is shown to transition from a highlighted (or pre-selected) state to an expanded state. The expanded state provides another example of a highlighting or pre-selection action, performed automatically in response to the user interaction with the particular content element 225, or with the specific graphical editing feature 237. For example, the user can enter a first pre-selection input to highlight the graphical editing feature 237, and then a second input to select the graphical editing feature 237. Once the graphical editing feature 237 is expanded, the content modification feature 239 for each content element provided with or as part of the section is displayed. The editor may interact with each 239 to specify, for example, visual attributes 133 for the corresponding content element.

Likewise, the user may preselect a given one of the graphical editing feature 237, in order to highlight the corresponding content element 225 of the DUC 205 that corresponds to that 237. In this way, the user can individually highlight sectional features to locate the particular content element that the user wishes to modify.

As shown by an example of FIG. 2B, when the graphical editing feature 237 is selected, a set of content modification features 239 are revealed to enable the editor to alter the visual attributes of corresponding content elements provided with the DUC 205. According to examples, the content modification feature 239 enable the editor to change metadata associated with the corresponding content element 225 (e.g., with a corresponding section). For a given content element 225, the content modification feature 239 can include, for example, a background image selection feature, background color or border selection, perimeter thickness, button type, text, button linking feature. The alterations that are specified by the editor can result in the metadata associated with the content element 225 being changed with the document data set 130. In this way, the DUC 205 can be updated immediately to reflect the change specified by the user.

In some variations, the input specified by the user can be initiated even before the user saves or applies the changes to the design editing panel 235. Thus, the DUC 205 can provide immediate feedback to the editor as the editor progresses through changes to a specific content element of the section 122.

In an example of FIG. 2B, the content modification feature 239 which are revealed can be functionally configured for the type of content element that the feature represents. For example, the background image feature can enable the user to specify a file location, while a color selection feature enables the editor to select a color palate.

With further reference to an example of FIG. 2A and FIG. 2B, the graphical editing feature 237 of the design editing panel 235 can individually, or in combination, represent contextual aspects of the content elements 225 of the DUC 205. For example, the graphical editing feature 237 can represent the position of the content elements in the document relative to other sections. In some examples, sections are defined to extend a width of the DUC 205, and the corresponding sectional features 237 are aligned vertically to represent the vertical order of the sections in the document.

Figure 2C:
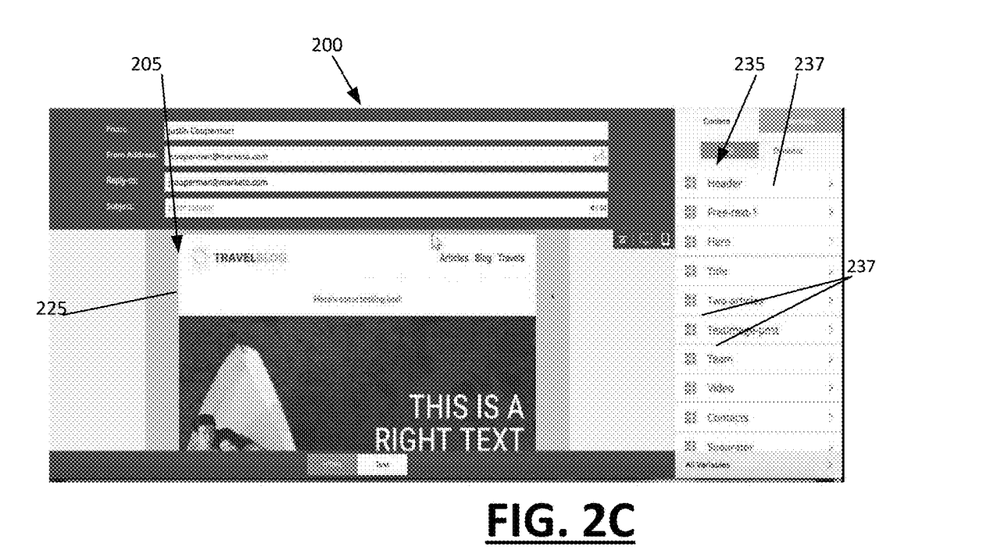

In an example of FIG. 2C, the graphical editing feature 237 are shown to be rearranged in their respective vertical alignment. The editor may move, for example, the graphical editing feature 237 from a first vertical position to a second vertical position. The input may alter the contextual metadata 129 of the document data set 130. As shown by an example of FIG. 2C, the change in the contextual metadata is immediately reflected on the DUC 205. In particular, the rearrangement of the graphical editing feature 237 results in the corresponding content elements 225 of the DUC 205 to be moved relative to one another, so that the arrangement of the content elements of the document reflects the arrangement of the graphical editing features 237 of the design editing panel 235.

Figure 2D:
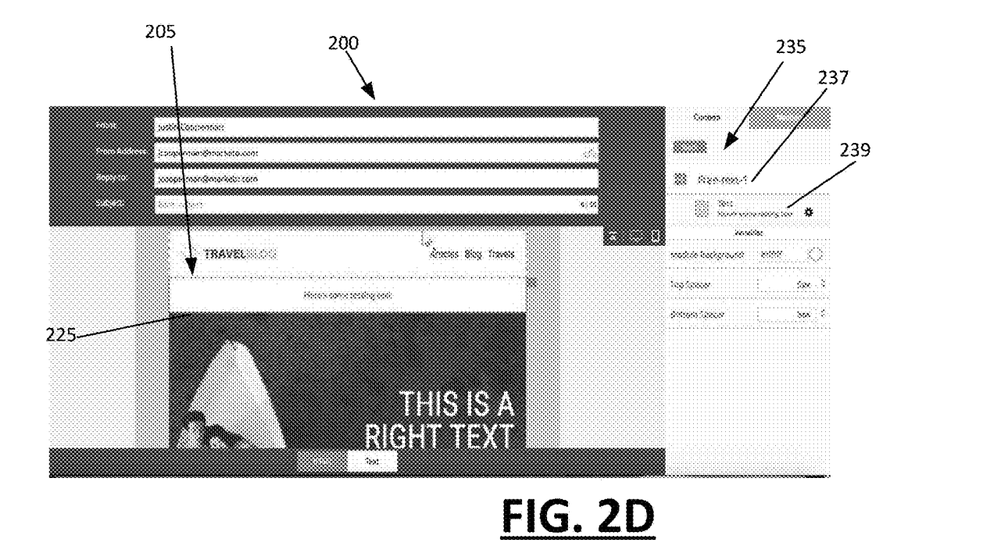

In an example of FIG. 2D, the editor interacts with the DUC 205 to specify the graphical editing feature 237 to highlight and select features of the design editing panel 235. In particular, the editor can interact with the DUC 205 to graphical editing features 237 provided on the design editing panel 235. The design editing panel 235 may include functionality to enable the editor to directly interact with (e.g., with touch-input) a given graphical editing features 237, in which case the corresponding content element 225 of the DUC 205 is pre-selected or selected. Once a particular graphical editing feature 237 is selected, the content modification feature 239 for the corresponding graphical editing features is displayed, to enable the user to, for example, alter attribute metadata 133 of the selected content element 225. As described with preceding examples, the user interaction with the content modification feature 239 which are provided for the selected graphical editing feature 237 can be immediately recorded and reflected with the DUC 205.

While FIG. 2A through FIG. 2D illustrate examples of content elements which define attributes or integral aspects of a given section, in some variations, content elements (e.g., images, text fields, animation, etc.) may be selected as content objects. The content objects may define an association between multiple selected content elements and/or corresponding sections of the DUC 205. In this regard, content objects may be formed and represented on the design editing panel 235. The content objects may be structured so that one or more content elements are dependent or linked (e.g., hierarchically) with another content element. The content modification feature 239 of the design editing panel 235 may enable the selection of content elements for use as content objects, via the content panel 245. The set of content modification features 239 of the design editing panel 235 may also enable the editor to specify configurations as contextual metadata, such as what content elements are to form a content element, and the relationship between the content elements of the content object. Still further, the set of content modification features 239 of the design editing panel 235 may also enable the editor to specify attribute metadata 133 for the content elements of a given content object (e.g., color, shape, line width, etc.).

Figure 2E:
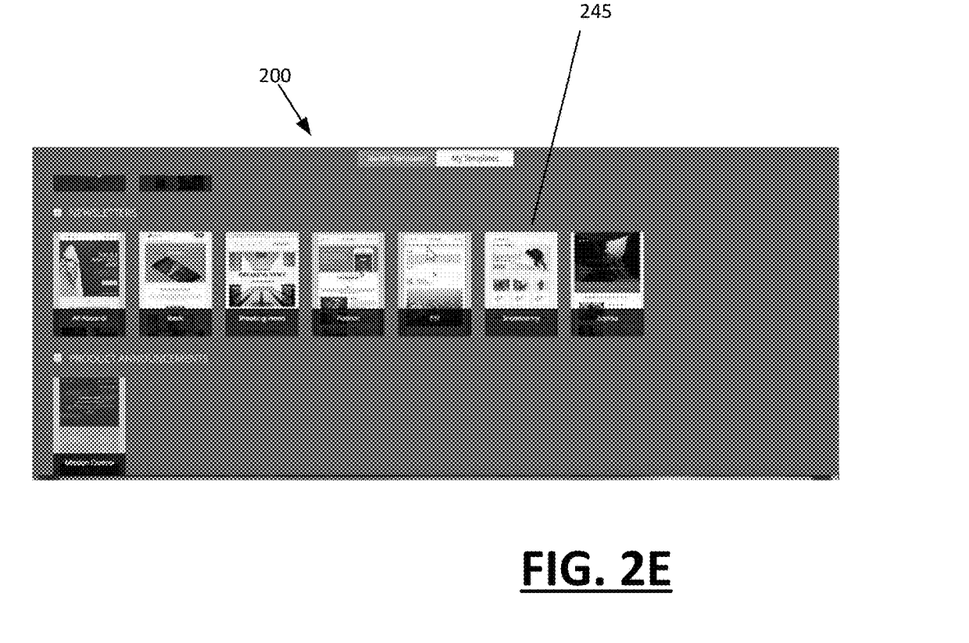

FIG. 2E illustrates an example content interface 245, which can be displayed as part of the presentation 200 to enable the editor to select content elements from, for example, a template library. The content panel 245 may be displayed selectively with the presentation, for example, as an alternative or toggled mode that substantially replaces the design editing panel 235. The selection of the content panel 245 can be through a variety of mechanisms, such as a tab selection, or through interaction with a given type of 239 for which content selection may be specified.

With further reference to the examples of FIG. 2A through FIG. 2E, the presentation 200 can include logic to implement alternative modes for viewing the document. In one implementation, the presentation 200 includes a mode view feature 208 which the user can select to view the DUC 205 as a recipient or viewer on a given platform. For example, the mode view feature 208 can enable the editor to view the DUC 205 from a perspective of a desktop computer or mobile computing device. With either platform, the content elements, structure and/or layout of the DUC 205 can vary to optimize the appearance of the DUC 205 for a selected platform.

Figure 3:
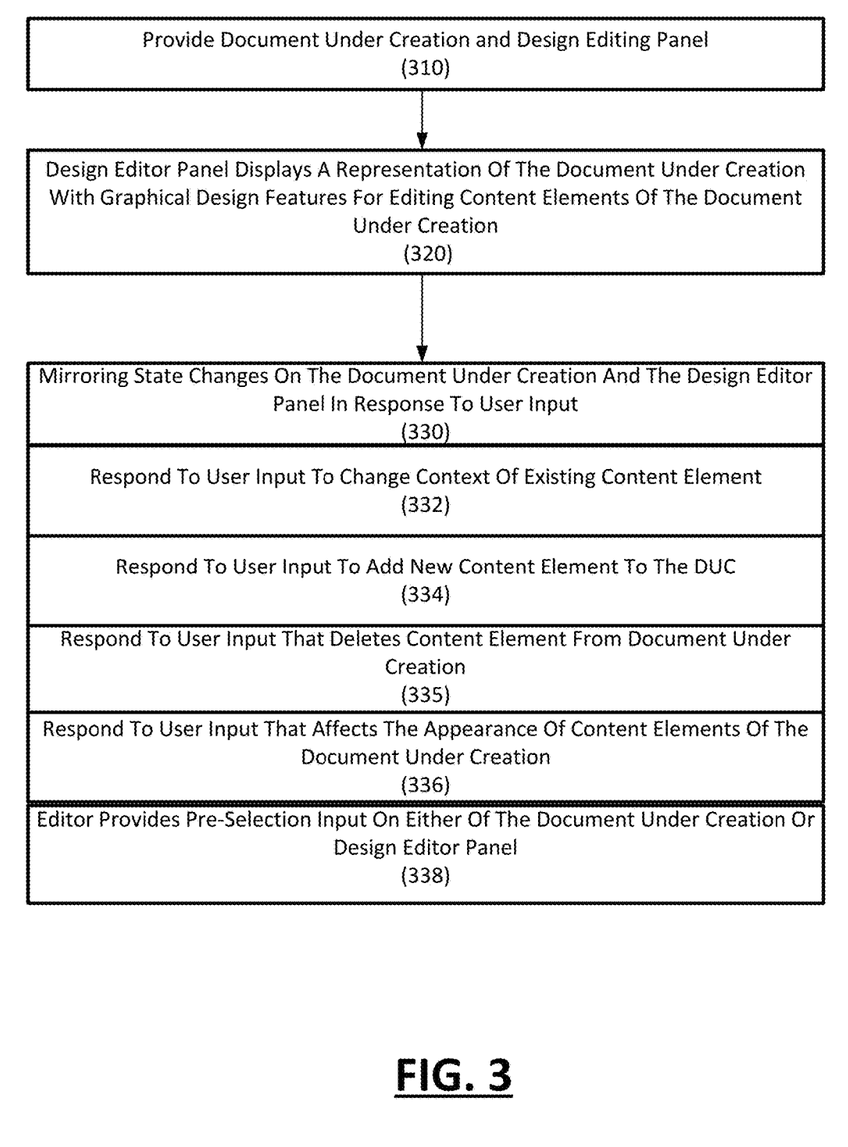
FIG. 3 illustrates an example method for enabling an editor to create an electronic document.

FIG. 3 illustrates an example method for enabling an editor to create an electronic document. An example method such as described with FIG. 3 may be implemented using, for example, a system such as described with an example of FIG. 1. Accordingly, reference is made to elements of FIG. 1 for purpose of illustrating suitable components for performing a step or sub-step being described.

With reference to FIG. 3, the system 100 generates a presentation that provides an interactive document under creation and an editor panel (310). The design editing panel 135 can be used by an editor to select content elements 131 for display on the document. The content elements may be selected from, for example, the content library 140, which may store each selected content element with a default set of attribute metadata 133.

The DUC 105, for example, may be structured, based on editor input, to display content elements in accordance with each of (i) a spatial arrangement or layout of the DUC 105 and/or position of individual content elements, and (ii) a logical relationship as between at least some of the content elements. Each content element may be associated with contextual metadata 129, which defines the relative spatial location of the content element in the layout of the DUC 105, and/or the logical relationship of the content element with one or more other content elements of the document.

The design editing panel 135 may display a representation of the DUC 105 using a set of interactive features (320). The representation of the DUC 105 may be based on metadata associated with the content elements 131 of the DUC 105. Each of the graphical editing feature 137 may be displayed in accordance with a spatial attribute that reflects the layout and/or logical association of the content element of the DUC 105. The spatial attribute of the interactive features may be based on the contextual metadata 129 associated with the content elements. In some examples, the interactive features of the panel 135 may also include characteristics that reflect one or more attributes of the corresponding content element. For example, the interactive feature may be represented by a thumbnail representation with the interactive panel. Thus, for example, the design editing panel 135 may reflect a layout of the 102, a logical association between at least some content elements of the 102, and one or more visual attributes of the content elements of the 102.

An editor can interact with either of the DUC 105 or the design editing panel 135, to create a mirrored state change on both of the DUC 105 and the design editing panel 135 (330). In some examples, the mirrored state change may be reflected when the user interacts with the DUC 105 to change contextual information about a particular content element (332). For example, the user may re-position a content element, or change a logical relationship amongst two or more content elements. The canvas 112 for the DUC 105 records the contextual attributes 129 that correspond to the changes of the user. The designer module 120 may refresh or update based on the document map 128, and the altered contextual information may be reflected in the layout, order, or positioning of the graphical editing features 137 of the design editing panel 135.

In variations, the user may also interact with the presentation 200 to add a new content element to the DUC 105, which is then mirrored on the design editing panel 135 (334). For example, the user may interact with the content panel 145 to select a new content element 131 from the template library. The user may drop the new content element 131 on the DUC 105, causing changes to the document map 128. The new content element 131 may be associated with attribute metadata 133 (e.g., color, shape, dimension, contents etc.) and contextual metadata 129 (e.g., placement of new content element 131 on DUC 105, relationship of new content element with other content elements 131) on the document map 128. The designer module 120 may use the document map 128 to create a graphical design feature 137 that represents the new content element. The graphical design feature 137 can be displayed to reflect an attribute (e.g., color, content type) or context (e.g., relative position to other graphical design features 137) of the newly placed content element on the DUC 105.

In similar fashion, the user may remove a content element from the DUC 105, resulting in a mirrored action on the design editing panel 135 (335). The canvas 112 may detect the change, and remove the data representation of the removed content element from the document map 128. In turn, the designer module 120 may update the design editing panel 135 using the document map 128, so that the graphical design feature 137 for the removed content element is no longer displayed.

According to some examples, the mirrored state change is also reflected by changes that affect the appearance of one or more of the content elements of the DUC 105 (336). The state change can result from the editor interacting with, for example, either of the DUC 105 or the design editing panel 135 to alter the layout of the DUC 105, the logical association of content elements of the DUC 105, and/or visual attributes of individual content elements.

In some implementations, the editor interaction may alter the metadata associated with the content elements 131 that are rendered on the DUC 105. In this way, editor input to alter the DUC 105 results in changes to the design editing panel 135. Likewise, the editor can enter input using interactive features of the design editing panel 135 in order to implement changes to the content elements on display with the DUC 105. Through interaction with either of the DUC 105 or the design editing panel 135, the editor can also provide input to alter each of the spatial arrangement and the logical relationship amongst at least some of the plurality of content elements provided on the DUC 105.

In some examples, the state change may also be reflect the editor specifying pre-selection input on either the DUC 105 or the design editing panel 135 (338). In particular, the system 100 may respond to the editor pre-selecting a content element of the DUC 105 by highlighting both the selected content element on the DUC 105, and the corresponding interactive feature on the design editing panel 135. Likewise, when the user selects an interactive feature of the design editing panel 135, the system 100 may mirror the user selection by highlighting a corresponding content element on the DUC 105. In this way, the system 100 may generate mirrored feedback that highlights a selected content element or interactive feature the indicated content element and the representation of the content element as an interactive feature on the design editing panel 135. Among other benefits, the editor can, for example, pre-select a content element to modify on the DUC 105, and the corresponding interactive feature can be modified on the design editing panel 135. The editor can then provide input through the interactive feature to modify the pre-selected content element on the 102.

Figure 4:
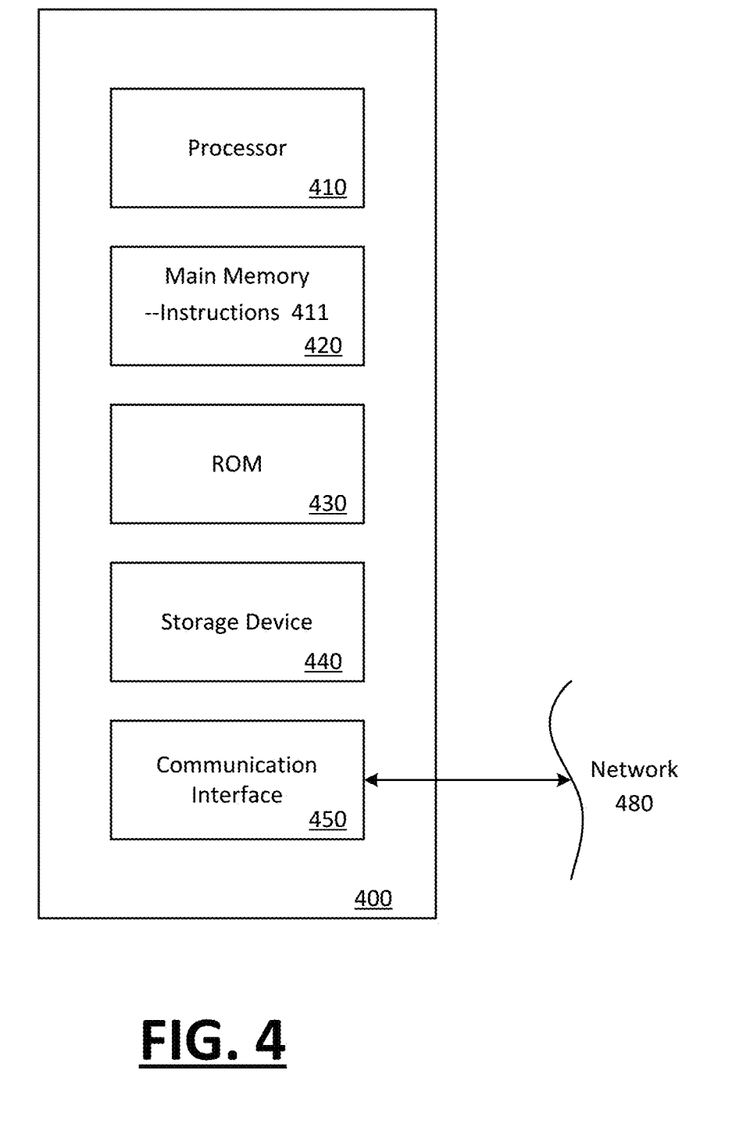
FIG. 4 is a block diagram that illustrates a computer system upon which examples described herein can be implemented.

FIG. 4 is a block diagram that illustrates a computer system upon which examples described herein can be implemented. For example, the computer system 400 can execute system instructions 411 to implement the document editing system 100, as described with FIG. 1, FIG. 2A through FIG. 2E, and FIG. 3.

In an example, computer system 400 includes processor 404, memory 406 (including non-transitory memory), storage device 410, and communication interface 414. Computer system 400 includes at least one processor 404 for processing information. Computer system 400 also includes a main memory 406, such as a random access memory (RAM) or other dynamic storage device, for storing information and instructions to be executed by processor 404. Main memory 406 also may be used for storing temporary variables or other intermediate information during execution of instructions to be executed by processor 404. Computer system 400 may also include a read only memory (ROM) or other static storage device for storing static information and instructions for processor 404. A storage device 410, such as a magnetic disk or optical disk, is provided for storing information and instructions. The communication interface 414 may enable the computer system 400 to communicate with one or more networks through use of the network link 420 (wireless or wireline).

In one implementation, memory 406 may store instructions 411 for implementing functionality such as described with an example of FIG. 1, FIG. 2A through FIG. 2E, and FIG. 3. Likewise, the processor 404 may execute the instructions in providing functionality as described with FIG. 1, FIG. 2A through FIG. 2E, and FIG. 3.

Embodiments described herein are related to the use of computer system 400 for implementing the techniques described herein. According to one embodiment, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement embodiments described herein. Thus, examples described are not limited to any specific combination of hardware circuitry and software.

Although illustrative embodiments have been described in detail herein with reference to the accompanying drawings, variations to specific embodiments and details are encompassed by this disclosure. It is intended that the scope of embodiments described herein be defined by claims and their equivalents. Furthermore, it is contemplated that a particular feature described, either individually or as part of an embodiment, can be combined with other individually described features, or parts of other embodiments. Thus, absence of describing combinations should not preclude the inventor(s) from claiming rights to such combinations.

What is claimed is:

1. A computer system comprising:
   a memory to store a set of instructions:
   one or more processors to retrieve and execute the set of instructions to:
     provide a user interface including (i) a document under creation, and (ii) a design editing panel, separate from the document under creation, to enable a user to select a plurality of content elements for display as part of the document under creation;
     structure the document under creation to display the plurality of content elements as part of the document under creation, in accordance with a spatial arrangement of the plurality of content elements;
     provide, with the design editing panel, for each of the plurality of content elements, a corresponding one of a plurality of interactive graphical editing features in an order based on the spatial arrangement of the plurality of content elements; and
     in response to the spatial arrangement of the plurality of content elements being altered on the document under creation, automatically alter the order of the plurality of interactive graphical editing features on the design editing panel to reflect the plurality of content elements in the altered spatial arrangement.

2. The computer system of claim 1, wherein the one or more processors execute instructions to:
   enable the user to select a new content element;
   render the new content element as part of the document under creation; and
   automatically alter the plurality of interactive graphical editing features of the design editing panel to include an interactive graphical editing feature representing the new content element.

3. The computer system of claim 1, wherein the one or more processors execute instructions to:
   display the interactive graphical editing feature representing a new content element based on contextual metadata determined from a position or logical relationship of the new content element.

4. The computer system of claim 1, wherein the one or more processors execute instructions to:
   enable the user to interact with the document under creation to alter a logical relationship amongst at least some of the plurality of content elements; and
   in response to the logical relationship amongst at least some of the plurality of content elements being altered, automatically alter the order of the plurality of interactive graphical editing features to reflect the altered logical relationships.

5. The computer system of claim 1, wherein the one or more processors execute instructions to:
   enable the user to pre-select one of the content elements of the document under creation; and
   in response to the user pre-selecting the content element, performing one or more actions to at least highlight an interactive graphical editing feature of the design editing panel that corresponds to the pre-selected content element.

6. The computer system of claim 1, wherein the one or more processors execute instructions to perform one or more actions that include revealing, with a corresponding interactive graphical editing feature, one or more content modification features for modifying one or more attributes of the pre-selected content element.

7. The computer system of claim 1, wherein the plurality of content elements include content elements that are structured by the document under creation to be of a particular type.

8. The computer system of claim 7, wherein the plurality of content elements include each of a section and a content object.

9. The computer system of claim 1, wherein the design editing panel displays, for at least some of the interactive graphical editing features, a content modification feature to enable the user to alter an attribute of a corresponding content element.

10. The computer system of claim 9, wherein a functionality of the content modification feature is specific to a type of the attribute that is being modified.

11. The computer system of claim 10, wherein in response to the user altering the attribute of one of the content elements of the document under creation, the one or more processors execute the instructions to automatically alter an appearance of a corresponding interactive graphical editing feature to reflect a change in the attribute.

12. The computer system of claim 1, wherein the one or more processors execute the instructions to enable the user to interact with the design editing panel to alter the order of the plurality of interactive graphical editing features, and to automatically change the spatial arrangement of the plurality of content elements to reflect the altered order of the plurality of interactive graphical editing features.

13. The computer system of claim 1, wherein the one or more processors execute the instructions to enable the user to interact with the design editing panel to change a logical relationship amongst at least some of the plurality of content elements of the document under creation.

14. The computer system of claim 13, wherein the logical relationship amongst at least some of the plurality of content elements includes a hierarchical relationship.

15. The computer system of claim 13, wherein the logical relationship amongst at least some of the plurality of content elements includes a hierarchical relationship as between multiple content elements that are each a content object.

16. The computer system of claim 1, wherein the one or more processors execute the instructions to enable the document under creation to alter an appearance of the document under creation to account for a particular type of computing environment on which the document under creation is to be rendered.

17. The computer system of claim 1, wherein the document under creation corresponds to an email, a catalog, a newsletter, or a page of a publication.

18. A method for creating electronic documents, the method being implemented by one or more processors and comprising:
providing a user interface including (i) a document under creation, and (ii) a design editing panel, separate from the document under creation, to enable a user to select a plurality of content elements for display as part of the document under creation;
structuring the document under creation to display the plurality of content elements as part of the document under creation, in accordance with a spatial arrangement of the plurality of content elements;
providing, with the design editing panel, for each of the plurality of content elements, a corresponding one of a plurality of interactive graphical editing features in an order based on the spatial arrangement of the plurality of content elements; and
in response to the spatial arrangement of the plurality of content elements being altered on the document under creation, automatically altering the order of the plurality of interactive graphical editing features on the design editing panel to reflect the plurality of content elements in the altered spatial arrangement.

19. The method of claim 18, wherein the method is implemented as part of a network service.

20. A computing device comprising a display screen, the computing device being configured to:
display on the screen a user interface including (i) a document under creation, and (ii) a design editing panel, separate from the document under creation, to enable a user to select a plurality of content elements for display as part of the document under creation;
structure the document under creation to display the plurality of content elements as part of the document under creation, in accordance with a spatial arrangement of the plurality of content elements;
provide, with the design editing panel, for each of the plurality of content elements, a corresponding one of a plurality of interactive graphical editing features in an order based on the spatial arrangement of the plurality of content elements; and
in response to the spatial arrangement of the plurality of content elements being altered on the document under creation, automatically alter the order of the plurality of interactive graphical editing features on the design editing panel to reflect the plurality of content elements in the altered spatial arrangement.

* * * * *